June 29, 1937.  W. L. GINN  2,085,678

ROTARY CHECKING ATTACHMENT FOR PLANTERS

Filed June 3, 1936  2 Sheets-Sheet 1

June 29, 1937.   W. L. GINN   2,085,678
ROTARY CHECKING ATTACHMENT FOR PLANTERS
Filed June 3, 1936   2 Sheets-Sheet 2

Inventor
W. L. Ginn.
By L. F. Laudreth Jr.
Attorney

Patented June 29, 1937

2,085,678

UNITED STATES PATENT OFFICE 2,085,678

ROTARY CHECKING ATTACHMENT FOR PLANTERS

William L. Ginn, Muncie, Ind.

Application June 3, 1936, Serial No. 83,391

3 Claims. (Cl. 111—23)

This invention relates to a rotary checking attachment for corn planters and the like.

It is aimed to provide a novel construction which may be made as at attachment to existing types of planters and it simplifies mechanisms of this general character and particularly those depending upon check wires as it saves time in turning at the ends of a field, has no wires to stretch, has no stakes to be moved, and is not bothered by obstructions like trees, stumps, rocks and the like. The operator at all times remains seated and the planting operation may start from any desired point.

The more specific objects and advantages will become apparent from a consideration of the description following taken in connection with accompanying drawings illustrating an operative embodiment.

In said drawings:—

Figure 1:
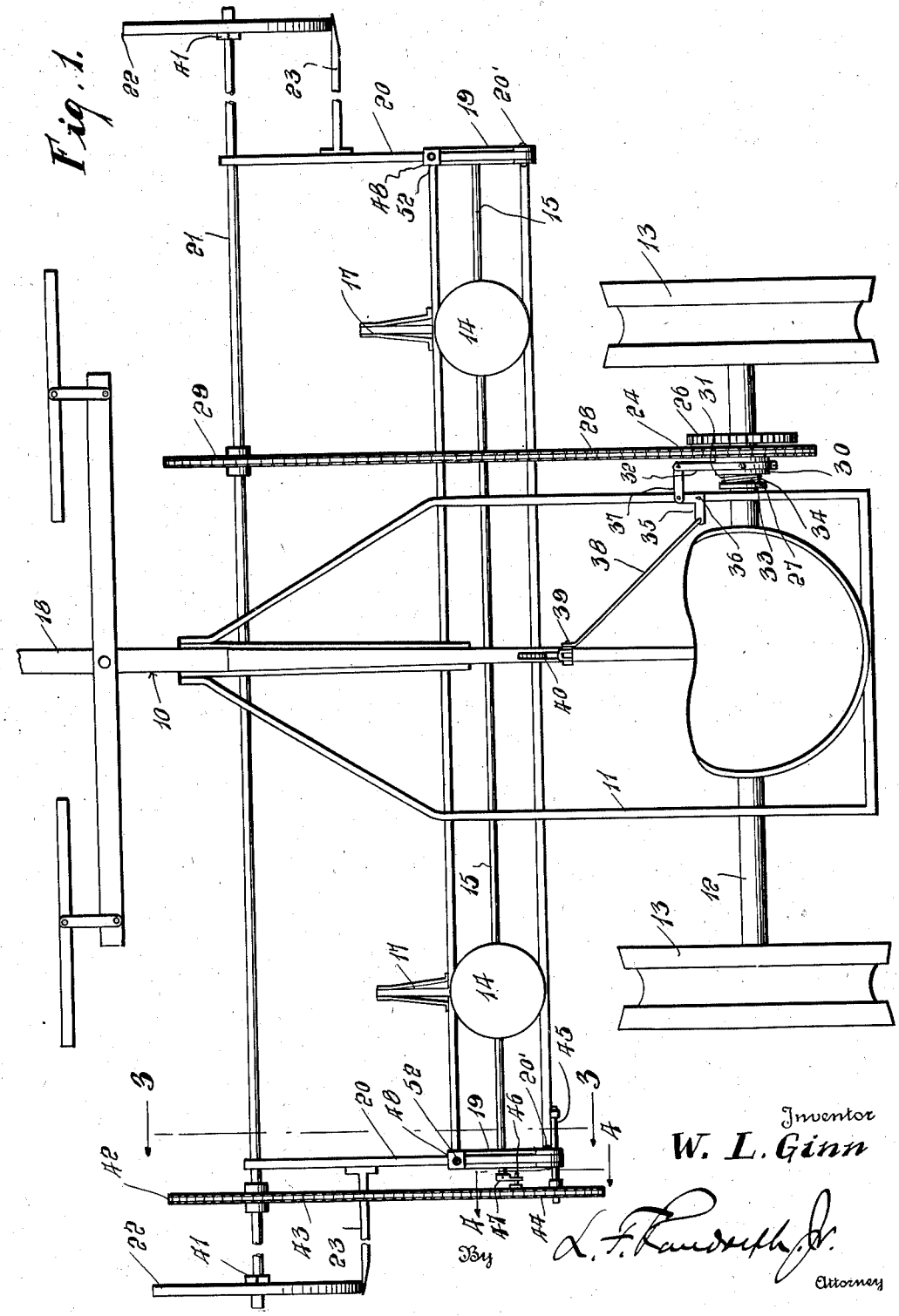
Figure 1 is a plan view of a planter equipped with my attachment.
Figure 2:
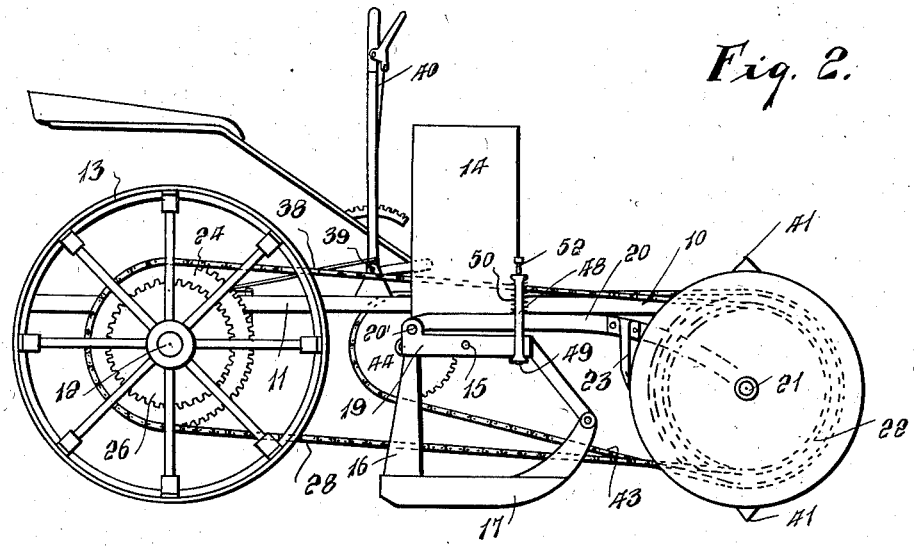
Figure 2 is an end elevation of such planter and attachment.
Figure 3:
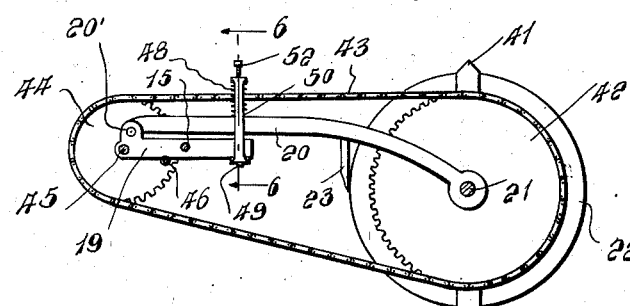
Figure 3 is an end elevation of a part of the attachment alone.
Figure 6:
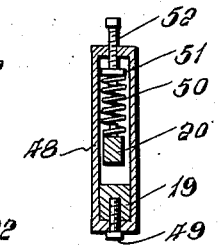
Figure 6 is a detail section taken on the line 6—6 of Figure 2.

Referring specifically to the drawings wherein like reference characters designate like or similar parts, a corn planter of conventional form is shown as at 10 having a suitable frame 11 provided with an axle 12 mounting ground wheels 13. The frame carries usual seed boxes at 14 equipped with usual valves operatively connected to a rotatable shaft 15 suitably journalled on the frame 11 and with each of which seed boxes, a discharge tube or drill 16 and an associated runner 17 is provided. Suitable draft means for the hitching of animal power, a tractor or the like is connected to the frame as at 18.

Carrying out the present invention, a pair of brackets 19 are rigidly fastened at opposite sides of the frame 11 and to each bracket, an arm 20 is pivoted at 20' and at the rear end of the arms, a transverse shaft 21 is suitably journalled therein. Rigid with said shaft, are marker wheels 22 adapted to travel on the ground. Suitable scrapers for the marker wheels 22 are carried by the arms 20 at 23.

A sprocket wheel 24 has a hollow clutch portion 25 at one side thereof adapted for engagement with a fixed clutch member 26, secured to the shaft 12. Clutch member 26 has a hub 27 integral therewith and the sprocket 24 is slidable on said hub and also rotatable on said hub. Traversing the sprocket wheel 24 is a sprocket chain 28 which also traverses a sprocket wheel 29 keyed to the shaft 21. Fastened to the sprocket wheel 24 is a grooved collar 30 in the groove of which a yoke 31 is connected and from which an arm 32 extends.

Such collar 30 is engaged by an expansive spring 33 also engaging a fixed abutment 34 on the hub 27, the spring normally urging the sprocket 24 into clutched engagement with the clutch wheel 26.

Figure 5:
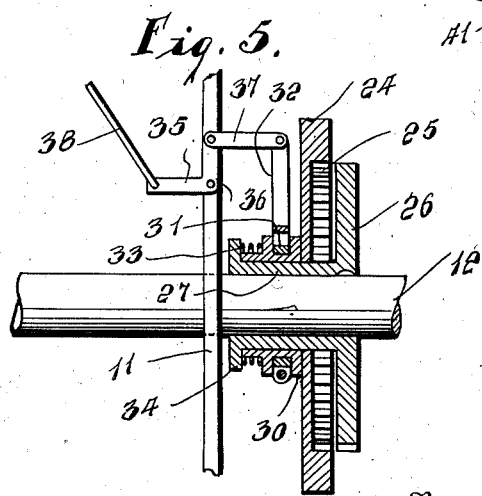
Figure 5 is a longitudinal section primarily showing the clutch mechanism.
Figure 4:
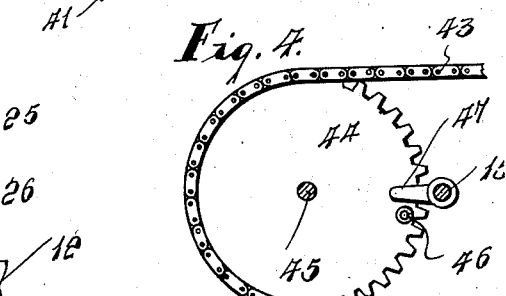
Figure 4 is a detail section taken on the line 4—4 of Figure 1.

A lever 35 is pivoted at 36 to the frame 11 and has a link 37 pivoted thereto and to the arm 32. In addition, a link or rod 38 is operatively connected at 39 to the main lever mechanism 40 of the planter. Such mechanism 40 includes a lever and a blocking pawl and segment therefor, and is conventional structure for raising and lowering the planters. Since my improvements are connected to the planter, the same will be raised and lowered with the frame, so that the attachment will not operate when the device is not being used, it being clear that the raising movement, upon the lever 40 being pulled upwardly, rocks the lever 35, link 32, and slides yoke 31, retracting the sprocket 24 as shown in Figure 5 so that it will not be driven by the shaft 12. However when the parts are lowered, the sprocket 24 at 25 is in clutched engagement with the clutch member 26, so that the parts will be operated through the rotation of said shaft 12.

The marker wheels 22 at diametrically opposite points, have marker members 41 thereon adapted to penetrate the soil. Said marker members may be of any desired construction and adjustable for retraction within the periphery of the markers or projection to any desired extent beyond the same.

On the shaft 21 a sprocket wheel 42 is keyed and trained thereover is a sprocket chain 43 also trained over a sprocket wheel 44 journalled on a stub shaft 45 fastened in one of the brackets 19. Eccentrically and adjustably connected to the sprocket wheel 44 is a projection 46 which is adapted to strike a projection or crank 47, on the shaft 15, which is a rock shaft, and journalled in the brackets 19.

Each time the lugs 46 engage the crank 47, the shaft 15 is rocked in order to actuate the valve of the seed boxes and thereby discharge seed from such boxes through the tubes 16.

The arms 20 are urged downwardly so as to maintain the marker wheels in contact with the ground under adjustable variable pressure. To this end, yokes 48 surround the brackets 19 and arms 20, being bolted or otherwise fastened as at 49 to the former. Expansive coil springs 50 are mounted within the yokes 48, contacting the upper surfaces of the arms 20 and at their upper ends having plates 51, which are engaged by screw elements 52 threaded in the upper ends of the yokes. The screw members 52 enable the tension of the springs 50 to be varied.

With the foregoing construction, the parts are so timed, that each time seeds are dropped from the boxes 14 through the rocking of the rods 15, the marker members 41 are in a vertical position. It is clear of course that the timing and number of the markers may be varied if desired. For example, and without any limitation as to size or operation, the wheels 22 are arranged so that they travel 21 inches from rows being planted which places the wheel next to the planted ground in the same track which was made in planting the preceding rows and enables the operator to see at all times that he is making a uniform width between the rows, and dropping corn or the other seeds in line with cross rows. The operator can see at any time when the machine is not in correct time since the lugs 41 should come in the same marks which were made in planting the preceding rows. Should the machine get out of proper timing, the operator operates the lever 40, raising the planter at the forward portion and arranging the parts in proper position. In turning, the front of the planter is raised through the operation of said lever 40, the machine being turned and stopping with the front wheel over the lug mark last made before turning, turns the front wheel lug so that it will enter the mark, lowers the planter and proceeds.

I claim as my invention:—

1. In combination with a planter, brackets thereon, a shaft controlling the discharge of seed from the planter journalled in said brackets, arms pivoted to the brackets, marker means engageable with the ground rotatably carried by said arms, means to drive the marker means from the planter, and means driven from the marker means to actuate said shaft.

2. In combination with a planter, brackets thereon, a shaft controlling the discharge of seed from the planter journalled in said brackets, arms pivoted to the brackets, marker means engageable with the ground rotatably carried by said arms, means to drive the marker means from the planter, means driven from the marker means to actuate said shaft, including a wheel having an eccentric projection thereon, and a projection on said shaft engageable by the first mentioned projection.

3. In combination with a planter, brackets thereon, a shaft controlling the discharge of seed from the planter journalled in said brackets, arms pivoted to the brackets, marker means engageable with the ground rotatably carried by said arms, means to drive the marker means from the planter, means driven from the marker means to actuate said shaft, including a wheel having an eccentric projection thereon, a projection on said shaft engageable by the first mentioned projection, and adjustable spring means connected to the brackets and urging said arms downwardly.

WILLIAM L. GINN.